United States Patent [19]

Boerwinkle

[11] 4,131,583

[45] Dec. 26, 1978

[54] CORROSION INHIBITING COMPOSITIONS

[75] Inventor: Fred P. Boerwinkle, St. Paul, Minn.

[73] Assignee: Northern Instruments Corporation, Lino Lakes, Minn.

[21] Appl. No.: 856,410

[22] Filed: Dec. 1, 1977

[51] Int. Cl.² .............................................. C23F 11/14
[52] U.S. Cl. ..................... 260/29.6 HN; 106/14.18; 106/14.31; 106/14.42; 148/6.14 R; 252/392; 260/29.6 N; 427/156
[58] Field of Search ........................ 252/392, 8.55 E; 106/14.18, 14.31, 14.42; 21/2.5 R, 2.7 R; 427/156; 208/47; 148/6.14 R; 260/29.6 HN, 29.6 N

[56] References Cited

U.S. PATENT DOCUMENTS

| | | | |
|---|---|---|---|
| 3,583,932 | 6/1971 | Benton et al. | 427/156 |
| 3,836,537 | 9/1974 | Boerwinkle et al. | 260/29.6 HN |
| 3,876,371 | 4/1975 | Costain et al. | 252/392 |
| 3,907,578 | 9/1975 | Scherrer et al. | 106/14.18 |
| 4,061,580 | 12/1977 | Jahnke | 252/389 A |

*Primary Examiner*—Benjamin R. Padgett
*Assistant Examiner*—Irwin Gluck

[57] ABSTRACT

Compositions are described which contain (a) a salt of carboxylic acid and organic amine, and (b) water-dispersible polymer. The compositions, which are preferably water-based, provide particularly good corrosion resistance to metals.

21 Claims, No Drawings

CORROSION INHIBITING COMPOSITIONS

BACKGROUND OF THE INVENTION

This invention relates to corrosion inhibition. More particularly, this invention relates to novel compositions which are useful for coating surfaces to provide temporary protection against corrosion.

There are numerous instances in industry where an easily-corrodable material (e.g. iron, steel, or other metal) is subjected to a variety of corrosive environments between the time when it is manufactured and the time when it is actually used as a raw material in the manufacture of an intended product. For example, sheet steel or iron, after it leaves the smelter and before it is incorporated by the purchaser into an end product, undergoes a considerable period (e.g. 3–12 months) of shipment, storage and handling. During such shipment, storage and handling, the metal may be subjected to environments which are capable of quickly corroding the surface of such material (e.g. environments such as air, air containing high humidity, rain, surface condensation, etc.). With increasing lenghts of time before use, or with increasing severity of the environment to which the material is subjected before use, the greater is the degree of corrosion.

Consequently, it is usually necessary to remove the undesirable corrosion which is present on the surface of the material before such material may be satisfactorily used by the purchaser. Unfortunately, this may be a very expensive and time-consuming process. Even more unfortunately, when the metal material is intended to be used in the manufacture of such products as painted or electroplated articles, even minute amounts of corrosion of the metal render such metal completely unsatisfactory for its intended purpose. In such event the metal must typically be returned to the smelter and replaced with new material.

In attempts to reduce or eliminate corrosion of metal during shipment and storage, various types of coatings and temporary protectants have been proposed. For example, it is possible to simply coat the metal with an oil, grease or wax. However, such types of coatings are not always effective, and they may be quite undesirable due to their flammability or oily nature. Furthermore, such types of coatings normally must be completely removed from the metal surface before the metal may be used in many manufacturing processes. Such removal naturally is time consuming and also requires the use of solvents, with attendant expense and pollution problems. Although the addition of conventional corrosion inhibiting materials to such oils, greases and waxes may render such types of coatings more effective, the problems associated with removal of the coating, when necessary, are not alleviated. Oil-based corrosion inhibiting compositions are described, for example, in U.S. Pat. Nos. 2,736,658 and 3,234,270.

Others have proposed the use of water soluble corrosion inhibiting materials. For example, in U.S. Pat. No. 2,918,390 there is proposed the treatment of metal with water soluble fatty acid amines, followed by treatment with a solution containing hexavalent chromium. In U.S. Pat. No. 3,017,353 there is described a composition which may be added to an aqueous phase or an oil phase. In U.S. Pat. No. 3,977,994 there is described an emulsion containing a mixture of certain amines and organic acids. In U.S. Pat. No. 3,625, 859 there are described specific corrosion inhibiting salts which are said to be soluble in either a water-based system or an oil-based system. In U.S. Pat. No. 3,573,225 there is described an aqueous solution containing specified amounts of specific salts. None of such patents, however, describe the novel compositions of the present invention.

SUMMARY OF THE PRESENT INVENTION

In accordance with the present invention there is provided a corrosion inhibiting composition comprising:

(a) an effective amount of a salt of a carboxylic acid and an organic amine, wherein said acid has 11 to 20 carbon atoms, and wherein said amine is selected from compounds of the formula (i)

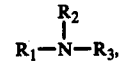

where $R_1$ is alkyl or alkenyl of 11 to 20 carbons, $R_2$ and $R_3$ are $-H$, $-CH_3$ or $-CH_2CH_2OH$; and (ii)

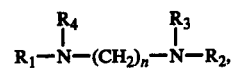

where n is an integer of 2–4, $R_4$ is $-H$, $-CH_3$ or $-CH_2CH_2OH$; and (b) a water-dispersible polymer derived from the free-radical-initiated addition polymerization of the following monomers in the mol percentage given:

(i) an amine monomer of the formula

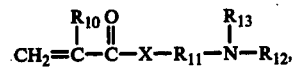

where $R_{10}$ is $-H$, $-CH_3$ or $-CH_2CH_3$, $R_{11}$ is $-CH_2CH_2-$ or $-CH_2CH_2CH_2-$, $R_{12}$ and $R_{13}$ are H or alkyl of 1-4 carbons; X is $-O-$, $-NH-$ or $-S-$; present in an amount of about 40 to 100 mol percent;

(ii) an acidic monomer of the formula

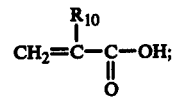

present in an amount of about 0 to 50 mol percent; and (iii)

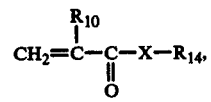

where $R_{14}$ is hydrogen or alkyl of 1–4 carbons; present in an amount of about 0 to 20 mol percent; wherein the total mol percent of acidic monomer in said polymer is not greater than the mol percent of said amine monomer.

The compositions of the invention are water-dispersible and accordingly are preferably applied to substrates from an aqueous medium. Various additives may be included to alter the physical properties of the composition or of coatings obtained therewith. The novel compositions are biodegradable, have low toxicity, and are accordingly environmentally benign. Such compositions impart excellent temporary corrosion resistance to substrates such as metals.

DETAILED DESCRIPTION OF THE INVENTION

The corrosion inhibiting compositions of the invention contain (a) a salt of a carboxylic acid and an organic amine, and (b) a water-dispersible polymer. Preferably, the composition is applied to the desired substrate from an aqueous medium.

The carboxylic acids which are useful in the preparation of the salts referred to above include mono- and di-carboxylic acids having 11 to 20 carbon atoms. These compounds may be saturated, although preferably they contain one or more sites of ethylenic unsaturation. The compounds may be cyclic or acyclic. Representative examples of carboxylic acids suitable for use in making the salts employed in this invention include oleic, linoleic, linolenic, stearic, margaric, palmitic, palmitoleic, myristic, lauric, undecylenic, hexylbenzoic, octylbenzoic, dodecyl succinic, decenyl succinic, commercially available mixtures such as soy bean- and tallow oil-derived fatty acids, and the like.

The organic amines which are useful in the preparation of the salts employed in this invention are selected from
(a) fatty amines of the formula

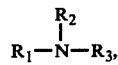

where $R_1$ is alkyl or alkenyl of 11–20 carbons, and $R_2$ and $R_3$ are —H, —CH$_3$, or —CH$_2$CH$_2$OH, and
(b) diamines of the formula

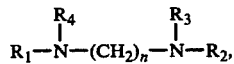

where n is an integer of 2 to 4 (preferably 3), where $R_1$, $R_2$ and $R_3$ are as defined above, and where $R_4$ is —H, —CH$_3$ or —CH$_2$CH$_2$OH.

Representative examples of fatty amines suitable for use in making the salts employed in this invention include oleyl, linoeyl, linolenyl, stearyl, margaryl, palmityl, myristyl, lauryl, undecylenyl, commercially available mixtures such as the amine fractions derived from, for example, tallow and soy bean oil fatty acid fractions, the corresponding methyl, dimethyl, hydroxyethyl and dihydroxy-ethyl derivatives and other amines of the formula which are well known to those skilled in the art.

Representative examples of diamines suitable for use in making the salts employed in this invention include N-substituted propylene diamines such as oleyl, linoleyl, linolenyl, stearyl, margaryl, palmityl, myristyl, lauryl, undecylenyl, commercially available mixtures such as the amine fractions derived from, for example, tallow and soy bean oil fatty acid fractions, the corresponding methyl, dimethyl, hydroxyethyl and dihydroxyethyl derivatives and other diamines of the formula which are well known to those skilled in the art.

The polymers which are useful in the compositions of this invention are ionic and water-dispersible. The term "water-dispersible" means that the polymer is either soluble or otherwise stably dispersible in water at the desired concentration. These polymers are derived from the free-radical-initiated addition polymerization of the following monomers in the mol percentages given.

(i) an amine monomer of the formula

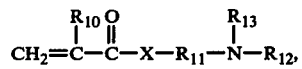

where $R_{10}$ is —H, —CH$_3$ or —CH$_2$CH$_3$, $R_{11}$ is —CH$_2$CH$_2$— or —CH$_2$CH$_2$CH$_2$—, $R_{12}$ and $R_{13}$ are H or alkyl of 1–4 carbons, X is —O—, —NH— or —S—; present in an amount of about 40 to 100 mol percent.

(ii) optionally, an acidic monomer of the formula

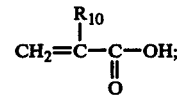

where $R_{10}$ is as defined above; this monomer being present in an amount ranging from 0 to about 50 mol percent.

(iii) optionally, a third monomer of the formula

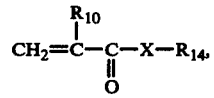

where $R_{10}$ is as defined above, where $R_{14}$ is hydrogen or alkyl of 1–4 carbons; this monomer being present in an amount ranging from 0 to about 20 mol percent; wherein the total mol percent of acidic monomer in said polymer is not greater than the mol percent of said amine monomer.

The polymers are prepared using conventional aqueous solution polymerization technique such as described in U.S. Pat. No. 3,836,537, incorporated herein by reference. For purposes of the present invention, it is preferred to polymerize the monomers to the extent that an aqueous solution of the desired polymer, at 24% by weight solids, exhibits a viscosity at room temperature, when measure on a Brookfield viscometer, in the range of about 1000 to 100,000 centipoise when measured with the appropriate spindle at the appropriate speed.

The optionally included acidic monomer, which may constituted up to 50 mol percent of the polymer (but not more than the mol percentage of amine monomer), may be included, for example, to enhance water- dispersibility of the polymer. Representative examples of such acidic monomers are acrylic and methacrylic acid. The optionally included third monomer, which may constitute up to about 20 mol percent of the polymer, may be included in order to adjust the stability or coating characteristics of the composition. Representative examples of such monomers are alkyl (C$_1$–C$_4$) acrylic and methacrylic esters and amides such as ethyl acrylate, butyl acrylate, and N,N-dimethyl acrylamide. Acrylamide and methacrylamide may also be used as this third monomer.

When the polymer is a homopolymer derived from the above-described amine monomer, it is necessary, when such homopolymer is used in aqueous coating compositions of this invention, to neutralize the basic groups on such polymer such that the pH of the final composition is brought into the range of about 6 to 8. It is preferred to neutralize such basic groups on the polymer, as described above, with a carboxylic acid having 6 to 10 carbon atoms; however, the basic groups may also be neutralized with carboxylic acids of the type used to prepare for $C_{11}$–$C_{20}$ acid-amine salt described above.

The corrosion inhibiting compositions of the invention are prepared by admixing the acid-amine salt described above with the water-dispersible polymer described above. Generally speaking, the weight ratio of the polymer to the acid-amine salt is in the range of about 1:0.25 to 0.25:1, and preferably in the range of about 1:1 to 1:0.5.

Preferably, the compositions of the invention are aqueous-based. Such compositions are preferably prepared by preparing a suitable concentration (e.g. 1–10% by weight) of polymer in water, followed by addition of the carboxylic acid-amine salt (e.g. in an amount of about 0.5–5% by weight). Optionally, the appropriate carboxylic acid and appropriate fatty amine may be added separately, in appropriate amounts, to a water solution of water-dispersible polymer at the desired concentration. The aqueous-based compositions are typically subjected to a high-shear mixing in order to effectively disperse the carboxylic acid-amine salt therein. Although some phase separation may tend to occur upon standing, the composition may be rendered effectively homogeneous again with simple stirring. Although the acid-amine salt and the polymer may be present in the compositions at amounts greater than those indicated above, there is no significant increase in the degree of effectiveness of the resulting coatings, and for reasons of economics it is preferred to operate within the limits above described.

In order to improve or enhance the water-removability of coatings obtained with compositions of this invention, without unduly sacrificing the corrosion inhibiting effectiveness of such coatings, or to improve vapor phase corrosion inhibition, it may be desirable to include in such compositions a second acid-amine salt. Such salt is prepared from carboxylic acids having 6 to 10 carbon atoms and an organic amine selected from:

(a)

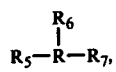

where $R_5$, $R_6$ and $R_7$ are selected from —H, alkyl and cycloalkyl, hydroxy-substituted alkyl and cycloalkyl, alkenyl and cycloalkenyl, and hydroxy-substituted alkenyl and cycloalkenyl, wherein the sum of the carbon atoms in $R_5$, $R_6$ and $R_7$ is in the range of 6 to 10, and (b)

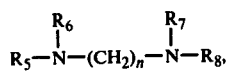

where $R_5$, $R_6$ and $R_7$ are as defined above, where $R_8$=$R_5$, where n is an integer of 2 to 4, and wherein the sum of the carbon atoms in $R_5$, $R_6$, $R_7$ and $R_8$ is in the range of 8 to 10.

Such acid-amine salt may also be included in compositions of this invention in order to improve effectiveness of coatings in the presence of normally corrosive anions, e.g. chloride and sulfate anions, which are common contaminants in industrial atmospheres. When such acid-amine salt is included in the aqueous coating compositions of the invention it may be present in an amount up to about 6% by weight of such composition. A particularly preferred salt of the above type is cyclohexylammonium benzoate.

Another optional additive known to the art, which may be included in aqueous compositions in amounts up to about 2% by weight, is an amide of the formula

where $R_1$, $R_2$ and $R_3$ are as defined above. Such additive may be included in order to enhance the stability or coating characteristics of aqueous-based compositions.

When it is desirable to have an aqueous-based coating composition which when applied to a substrate leaves a lubricious coating (i.e. oily, greasy or waxy), hydrocarbons such as paraffinic materials (e.g. mineral oil, petrolatum, or paraffin wax) may be included in the compositions in amounts up to about 10 percent by weight (but preferably not in an amount greater than the percent solids of such composition). These hydrocarbons are easily dispersed in aqueous compositions of this invention and in some cases actually improve the homogeneity of such compositions.

Still other additives which may be included in the compositions of the invention include low molecular weight alcohols (e.g. $C_1$–$C_6$ alcohols) in amounts up to about 20% by weight; microbiological preservations (e.g. formaldehyde, formaldehyde derivatives, lower alkyl p-hydroxy benzoates); dyes, perfumes, and the like.

Preferably, the corrosion-inhibiting compositions of the invention are applied to the desired substrate from an aqueous medium. Typically, standard coating techniques such as spraying, dipping or brushing may be used, although any manner of application of the composition is suitable so long as a substantially continuous coating on the substrate is obtained. The compositions of this invention have been found to provide particularly effective corrosion inhibition or resistance on metallic substrates including ferrous substrates (e.g. iron, steel), and non-ferrous substrates, such as copper and brass.

The invention is further illustrated by means of the following examples, wherein the term "parts" refers to parts by weight unless otherwise indicated.

EXAMPLE 1

A corrosion inhibiting composition is prepared by first preparing a water-dispersible ionic polymer, followed by adding to a water solution of such polymer appropriate amounts of carboxylic acid and amine such that the desired salt is formed in situ.

The water-dispersible polymer is prepared by the free-radical-initiated addition polymerization of the following monomers in the mol percentage stated:

|  | Mol % |
|---|---|
| dimethylaminoethylmethacrylate | 50 |
| methacrylic acid | 50 |

These monomers are dissolved in water in a suitable reaction vessel in an amount such that the total weight percentage of monomer in water is 24%. This solution is heated to approximately 70° C. with stirring, after which 0.5% (based on the weight of monomer) of ammonium persulfate catalyst is added. The reaction mixture exotherms to about 90° C. in about 15 minutes, and the reaction mixture is maintained at 90° C. for another 15 minutes, after which the polymer solution is cooled to room temperature. The polymer solution (23.5% – 24% solids) has a Brookfield viscosity in the range of 5000 to 10,000 cps., at room temperature, and a pH of 6.2.

A 12.5 milliliter sample of the above polymer solution is diluted with 87.5 milliliters of water to provide a water solution having 3% of weight polymer present therein. To this resulting polymer solution is added 0.5 gram oleyl amine, with stirring, after which 0.5 gram oleic acid is added, with stirring. To improve the dispersion of the acid-amine salt in the polymer solution, the mixture is subjected to mixing, for 3 to 5 minutes, by a Kraft Apparatus, Inc. Non-Aerating Stirrer (Model S-30). A slightly milky dispersion is obtained having a pH of about 6.4.

The product composition is applied to clean mild steel (number 1010) test panels (4 inches × 6 inches) by spraying so as to obtain a continuous coating on such panels. The thus coated panels are immediately suspended vertically, and allowed to dry at room temperature for at least 4 hours.

The coated test panels, and clean un-treated control panels, are then subjected to condensing humidity at 100° F. according to the procedure of ASTM D-1735-62. The degree of corrosion is reported according to the Standard Method of Evaluating Degree of Rusting on Painted Steel Surfaces, ASTM D-610-68.

The untreated control test panels exhibited Grade 8 corrosion (0.1% of surface corroded) after 3 hours, and Grade 1 corrosion (greater than 50% of surface corroded) after 24 hours.

The test panels coated with the corrosion inhibiting composition of this Example exhibited no corrosion at all (Grade 10) even after one week.

EXAMPLES 2 – 16

A variety of aqueous based corrosion inhibiting compositions are prepared and tested according to the procedures of Example 1. The formulations of the compositions are described in the following Table I.

The polymers used in such compositions are identified as follows:

| Type | Monomers (Mol %) |
|---|---|
| A | polymer of Example 1 |
| B | dimethylaminoethylmethacrylate (45%) methacrylic acid (45%) ethylacrylate (10%) |
| C | dimethylaminoethylmethacrylate (100%) |

Polymer C is neutralized with benzoic acid such that a water solution thereof has a pH in the range of 6 to 8.

The commercial ingredients listed in Table I are identified as follows:

"Lexgard P" is propyl-p-hydroxybenzoate; commercially available from Inolex Corporation.

"Ethomeen T-12" is diethoxylated tallow amine; commercially available from Armak.

"Alamine 26" is tallow primary amine; commercially available from General Mills, Inc.

"Ethomeen S-12" is diethoxylated soy amine; commercially available from Armak.

"Methocel E-15" is a modified water-soluble cellulose derivative; commercially available from Dow Chemical Co.

"Hyd Acid 1690" is a saturated fatty carboxylic acid having 16 carbons; commercially available from Ashland Chemical Co.

"Hyd Acid 1495" is a saturated fatty carboxylic acid having 14 carbons; commercially available from Ashland Chemical Co.

All of the compositions of Examples 2 – 16 imparted excellent corrosion resistance to mild steel, as indicated by the fact that all test panels received a rating of Grade 8, or better, after one week in the condensing humidity test described in Example 1.

TABLE I

| Ex. No. | Polymer Type | Polymer Weight % | $C_{11}$-$C_{20}$ Acid Type | $C_{11}$-$C_{20}$ Acid Weight % | $C_{11}$-$C_{20}$ Amine Type | $C_{11}$-$C_{20}$ Amine Weight % | $C_6$-$C_{10}$ Acid Type | $C_6$-$C_{10}$ Acid Weight % | $C_6$-$C_{10}$ Amine Type | $C_6$-$C_{10}$ Amine Weight % | Additive Type | Additive Weight % |
|---|---|---|---|---|---|---|---|---|---|---|---|---|
| 2 | A | 3 | oleic | 0.51 | oleyl | 0.49 | benzoic | 0.55 | cyclohexyl amine | 0.45 | "Lexgard P" | 0.2 |
| 3 | " | " | " | 0.45 | "Ethomeen T-12" | 0.55 | " | " | " | " | " | " |
| 4 | " | " | " | 0.51 | "Alamine 26" | 0.49 | — | — | — | — | — | — |
| 5 | " | " | " | 1.54 | oleyl | 1.46 | — | — | — | — | — | — |
| 6 | " | " | " | 0.5 | " | 0.5 | — | — | — | — | methylamyl alcohol | 1 |
| 7 | " | " | " | 0.45 | "Ethomeen S-12" | 0.55 | — | — | — | — | "Lexgard P" "Methocel E-15" | 0.2 0.02 |
| 8 | " | " | " | " | " | " | benzoic | 0.55 | cyclohexyl amine | 0.45 | "Lexgard P" | 0.2 |
| 9 | " | " | " | 2.0 | " | 3.0 | — | — | — | — | Mineral oil | 2 |
| 10 | " | " | "Hyd Acid 1690" | 2.0 | " | " | — | — | — | — | " | " |
| 11 | " | " | "Hyd Acid 1495" | " | " | " | — | — | — | — | " | " |
| 12 | " | " | oleic | 0.5 | oleyl | 0.5 | — | — | — | — | " | " |
| 13 | B | 1 | " | 1 | " | 1 | — | — | — | — | — | — |
| 14 | " | " | " | " | "Ethomeen S-12" | 1.3 | — | — | — | — | — | — |
| 15 | " | 3 | " | 1.5 | oleyl | 1.5 | — | — | — | — | — | — |
| 16 | C | 2 | " | 1 | " | 1 | — | — | — | — | — | — |

EXAMPLES 17 – 20

Commercially available corrosion-inhibiting compositions were tested on mild steel test panels in accordance with the procedure of Example 1. The results, after testing the panels for one week in the condensing humidity chamber, are reported below.

| Ex. No. | Composition | Grade |
|---|---|---|
| 17 | "VCIL", water-based commercially available from Al-Con Chemical Co. | 1 (greater than 50% corroded) |
| 18 | "Rust-Ban 343", oil based, commercially available from Exxon | 2 (greater than 33% corroded) |
| 19 | "Rust-Ban 4062", oil-based, commercially available from Exxon | 1 |
| 20 | "VSI 33", oil-based, commercially available from Shell | 1 |

EXAMPLE 21

An acid-amine salt is prepared by adding 0.5 part by weight oleic acid to 100 parts by weight water solution containing 0.5 part by weight oleyl amine. The resulting mixture does not form a composition which may be coated because of the insolubility of such salt, by itself, in water.

A 3% aqueous solution of the polymer of Example 1 is coated onto a mild steel test panel. Such coating provides no corrosion resistance at all since the panel corroded noticeably within 15 minutes of being coated.

What is claimed is:

1. A corrosion inhibiting composition comprising:
   (a) a salt of a carboxylic acid and an organic amine, wherein said acid has 11 to 20 carbon atoms, and wherein said amine is selected from the group consisting of:
   (i)

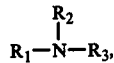

where $R_1$ is alkyl or alkenyl of 11 to 20 carbons, $R_2$ and $R_3$ are —H, —CH$_3$ or CH$_2$CH$_2$OH; and
   (ii)

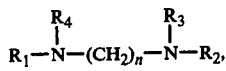

where n is an integer of 2 to 4, $R_4$ is —H, —CH$_3$ or —CH$_2$CH$_2$OH; and
   (b) water-dispersible polymer derived from the free-radical-initiated addition polymerization of the following monomers in the mol percentages given:
   (i) an amine monomer of the formula:

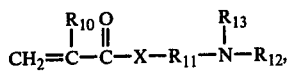

where $R_{10}$ is —H, —CH$_3$ or —CH$_2$CH$_3$, $R_{11}$ is —CH$_2$CH$_2$— or —CH$_2$CH$_2$CH$_2$—, $R_{12}$ and $R_{13}$ are H or alkyl of 1 to 4 carbons. X is —O—, —NH— or —S—; present in an amount of about 40 to 100 mol percent;
   (ii) an acidic monomer of the formula:

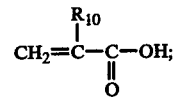

present in an amount ranging from 0 to about 50 mol percent; and
   (iii)

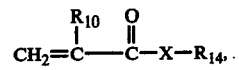

where $R_{14}$ is hydrogen or alkyl of 1 to 4 carbons; present in an amount ranging from 0 to about 20 mol percent;
   wherein the total mol percent of acidic monomer in said polymer is not greater than the mol percent of said amine monomer.

2. An aqueous coating composition comprising:
   (a) about 1 to 10 percent by weight of the composition of claim 1, and
   (b) about 90 to 99 percent by weight water.

3. A composition in accordance with claim 1, wherein the weight ratio of said polymer to said salt is in the range of 1:0.25 to 0.25:1.

4. A composition in accordance with claim 1, wherein said carboxylic acid has at least one site of ethylenic unsaturation and wherein said amine has at least one site of ethylenic unsaturation.

5. A composition in accordance with claim 1, wherein said polymer is derived from the copolymerization of
   (a) amine monomers selected from dimethylaminoethylmethacrylate, diethylaminoethylmethacrylate, and tertiary-butylaminoethylmethacrylate, and
   (b) acidic monomers selected from acrylic and methacrylic acid.

6. A composition in accordance with claim 1, wherein said polymer is derived from
   (a) amine monomers selected from dimethylaminoethylmethacrylate, diethylaminoethylmethacrylate and tertiary-butylaminoethylmethacrylate, and
   (b) acidic monomers selected from acrylic and methacrylic acid, and
   (c) monomer selected from ethylacrylate and butylacrylate.

7. A composition in accordance with claim 1, further comprising a second salt of a carboxylic acid having 6 to 10 carbon atoms and an organic amine selected from:
   (a)

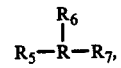

where $R_5$, $R_6$ and $R_7$ are selected from —H, alkyl and cycloalkyl, hydroxy-substituted alkyl and cycloalkyl, alkenyl and cycloalkenyl, and hydroxy-substituted alkenyl and cycloalkenyl, wherein the sum of the carbon atoms in $R_5$, $R_6$ and $R_7$ is in the range of 6 to 10, and
   (b)

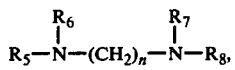

where $R_5$, $R_6$ and $R_7$ are as defined above, where $R_8 = R_5$, where n is an integer of 2 to 4, and wherein the sum of the carbon atoms in $R_5$, $R_6$, $R_7$ and $R_8$ is in the range of 8 to 10.

8. A composition in accordance with claim 1, further comprising an amide of the formula

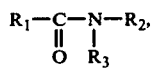

wherein $R_1$, $R_2$ and $R_3$ are as defined above.

9. A method of inhibiting corrosion on a substrate comprising applying the composition of claim 1 to said substrate.

10. An aqueous coating composition comprising, in an aqueous medium;
(a) an effective amount of a salt of a carboxylic acid and an organic amine, wherein said acid has 11 to 20 carbon atoms and wherein said amine is selected from the group consisting of:
(i)

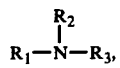

where $R_1$ is alkyl or alkenyl of 11 to 20 carbons, $R_2$ and $R_3$ are —H, —$CH_3$ or —$CH_2CH_2OH$; and
(ii)

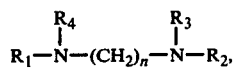

where n is an integer of 2 to 4, $R_4$ is —H, —$CH_3$ or —$CH_2CH_2OH$; and
(b) a water dispersible polymer derived from the free-radical-initiated addition polymerization of the following monomers in the mol percentages given:
(i) an amine monomer of the formula:

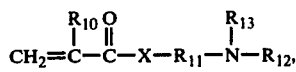

where $R_{10}$ is —H, —$CH_3$ or —$CH_2CH_3$, $R_{11}$ is —$CH_2CH_2$— or —$CH_2CH_2CH_2$—, $R_{12}$ and $R_{13}$ are H or alkyl of 1 to 4 carbons, X is —O—, —NH— or —S—; present in an amount of about 40 to 100 mol percent;
(ii) an acidic monomer of the formula:

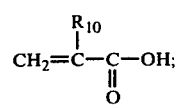

present in a amount ranging from 0 to about 50 mol percent; and
(iii)

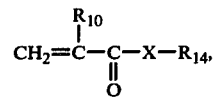

where $R_{14}$ is hydrogen or alkyl of 1 to 4 carbons; present in an amount ranging from 0 to about 20 mol percent;
wherein the total mol percent of acidic monomer in said polymer is not greater than the mol percent of said amine monomer.

11. A coating composition in accordance with claim 10, wherein said salt is present in an amount of about 0.5 to about 5 percent by weight, and wherein said polymer is present in an amount of about 1 to about 10 percent by weight.

12. A composition in accordance with claim 10, wherein said carboxylic acid has at least one site of ethylenic unsaturation and wherein said amine has at least one site of ethylenic unsaturation.

13. A composition in accordance with claim 10, wherein said polymer comprises a homopolymer of said amine monomer.

14. A composition in accordance with claim 10, wherein said polymer is derived from the copolymerization of
(a) amine monomers selected from dimethylaminoethylmethacrylate, diethylaminoethylmethacrylate. and tertiary-butylaminoethylmethacrylate, and
(b) acidic monomers selected from acrylic and methacrylic acid.

15. A composition in accordance with claim 10, wherein said polymer is derived from the copolymerization of
(a) amine monomers selected from dimethylaminoethylmethacrylate, diethylaminoethylmethacrylate and tertiary-butylaminoethylmethacrylate; and
(b) acidic monomers selected from acrylic and methacrylic cid; and
(c) monomer selected from ethylacrylate and butylacrylate.

16. A composition in accordance with claim 10, further comprising an amide of the formula

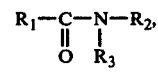

where $R_1$, $R_2$ and $R_3$ are as defined above.

17. A composition in accordance with claim 10, further comprising a second salt of a carboxylic acid having 6 to 10 carbon atoms and an organic amine selected from:
(a)

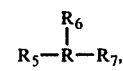

where $R_5$, $R_6$ and $R_7$ are selected from —H, alkyl and cycloalkyl, hydroxy-substituted alkyl and cycloalkyl, alkenyl and cycloalkenyl, and hydroxy-substituted alkenyl and cycloalkenyl, wherein the sum of the carbon atoms in $R_5$, $R_6$ and $R_7$ is in the range of 6 to 10, and
(b)

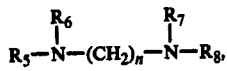

where $R_5$, $R_6$ and $R_7$ are as defined above, where $R_8 = R_5$, where $n$ is an integer of 2 to 4, and wherein the sum of the carbon atoms in $R_5$, $R_6$, $R_7$ and $R_8$ is in the range of 8 to 10.

18. A composition in accordance with claim 10, further comprising a hydrocarbon in an amount up to about 10 percent by weight.

19. A composition in accordance with claim 18, wherein said hydrocarbon is selected from mineral oil, mineral spirits and petrolatum.

20. A composition in accordance with claim 10 having a pH in the range of about 6 to 8.

21. A method for inhibiting corrosion on a substrate comprising applying the composition of claim 10 to said substrate.

* * * * *